United States Patent
Thurlkill

(10) Patent No.: US 10,337,156 B1
(45) Date of Patent: Jul. 2, 2019

(54) AUTONOMOUSLY CONTROLLED ANIMAL WASTE DISPOSAL SYSTEM AND METHOD OF USE

(71) Applicant: Joshua Thurlkill, McKinney, TX (US)

(72) Inventor: Joshua Thurlkill, McKinney, TX (US)

(*) Notice: Subject to any disclaimer, the term of this patent is extended or adjusted under 35 U.S.C. 154(b) by 258 days.

(21) Appl. No.: 15/486,532

(22) Filed: Apr. 13, 2017

(51) Int. Cl.
*E01H 1/00* (2006.01)
*B64C 39/02* (2006.01)

(52) U.S. Cl.
CPC ........... *E01H 1/006* (2013.01); *B64C 39/024* (2013.01); *B64C 2201/108* (2013.01); *B64C 2201/12* (2013.01); *B64C 2201/141* (2013.01); *B64C 2201/162* (2013.01)

(58) Field of Classification Search
CPC . E01H 1/006; B64C 39/024; B64C 2201/108; B64C 2201/12; B64C 2201/141; B64C 2201/162
See application file for complete search history.

(56) References Cited

U.S. PATENT DOCUMENTS

2018/0035606 A1* 2/2018 Burdoucci ........... A01D 34/008
2018/0075417 A1* 3/2018 Gordon ................ G05D 1/0088

* cited by examiner

*Primary Examiner* — Mary Cheung
(74) *Attorney, Agent, or Firm* — Eldredge Law Firm; Richard Eldredge

(57) ABSTRACT

A method to dispose of animal feces includes providing an autonomous aerial vehicle having a body with a plurality of rotor assemblies, an articulated claw secured to a bottom surface of the body, and a sensor secured to the body; detecting the presences of the animal feces with the sensor; activating the plurality of rotor assemblies; flying to the location of the animal feces; capturing the animal feces with the claw; flying to a disposal dropoff location; and disposing of the animal feces at the dropoff location.

1 Claim, 5 Drawing Sheets

US 10,337,156 B1

AUTONOMOUSLY CONTROLLED ANIMAL WASTE DISPOSAL SYSTEM AND METHOD OF USE

BACKGROUND

1. Field of the Disclosure

The present disclosure relates generally to a system for facilitating removal of animal waste material and associated methods.

2. Description of Related Art

Devices to collect and dispose of animal wastes are well known. It should be understood that municipal regulations require that animal feces be removed by the owner; a process that can be rather revolting to some. As such, there exist various devices that assist the owner in the cleanup process. According to one common method 101, the owner will utilize a portable broom 103 and shovel 105 to dispose of the feces 107. This solution has significant limitations and problems, such as the burden of carrying the broom and shovel, e.g., during a walk with the animal, and while the broom and shovel are soiled from the animal waste. In another known method, the owner will carry a number of bags to pick up and dispose of the feces. This solution also causes problems as the user is required to come in close contact with the feces. In yet another known method, a scooping device may be used to collect the feces and place it into a bag. The scooping device may overcome some of the problems associated with merely collecting the feces with a bag or shovel; however, the scooping device may not maintain the bag in a closed condition upon receipt of the feces, which in turn results in the bag not containing the unpleasant smell.

Although great strides have been made in the area of animal waste handling devices, some shortcomings remain.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
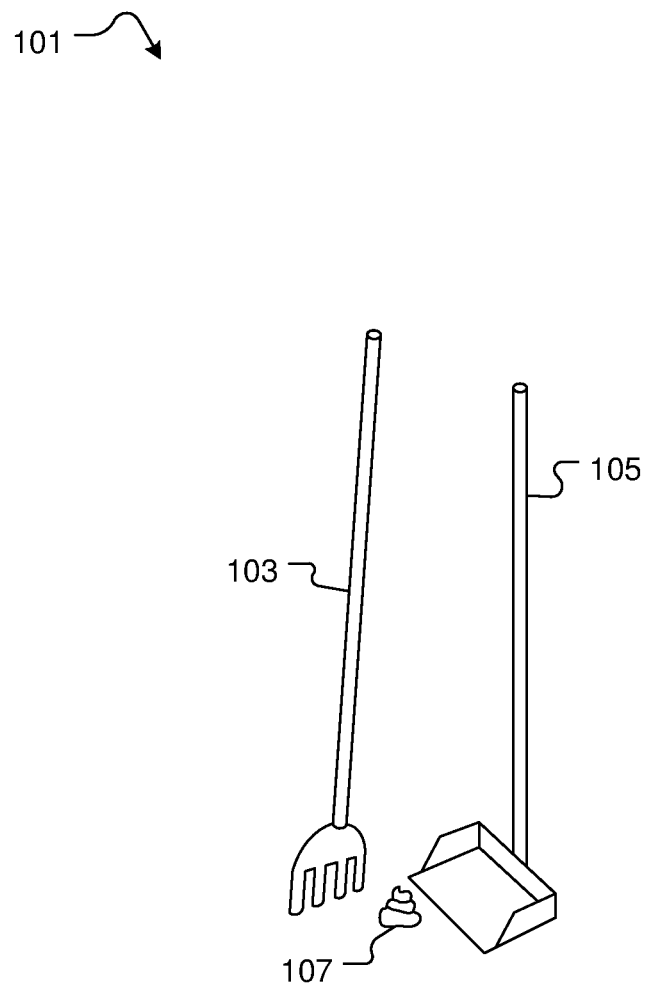
FIG. 1 is a perspective view of a conventional broom and shove used to collect animal waste.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF EXEMPLARY EMBODIMENTS

The aforementioned and other aspects, solutions, and advantages of the presently claimed subject matter will become apparent from the following descriptions and corresponding drawings. The embodiments further clarify the presently claimed subject matter and shall not be construed to limit the scope of the present claimed subject matter.

In the following detailed description, terms of orientation such as "top," "bottom," "upper," "lower," "front," "rear," and "end" are used herein to simplify the description of the context of the exemplary embodiments. Likewise, terms of sequence, such as "first" and "second," are used to simplify the description of the exemplary embodiments. Other orientations and sequences are possible.

Also, although various embodiments disclosed in the following detailed description are addressed to collection and removal of animal waste, a person with ordinary skill in the art will appreciate that these embodiments are perfectly suited for other applications not limited to removal of animal waste.

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the animal waste disposal system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2A:
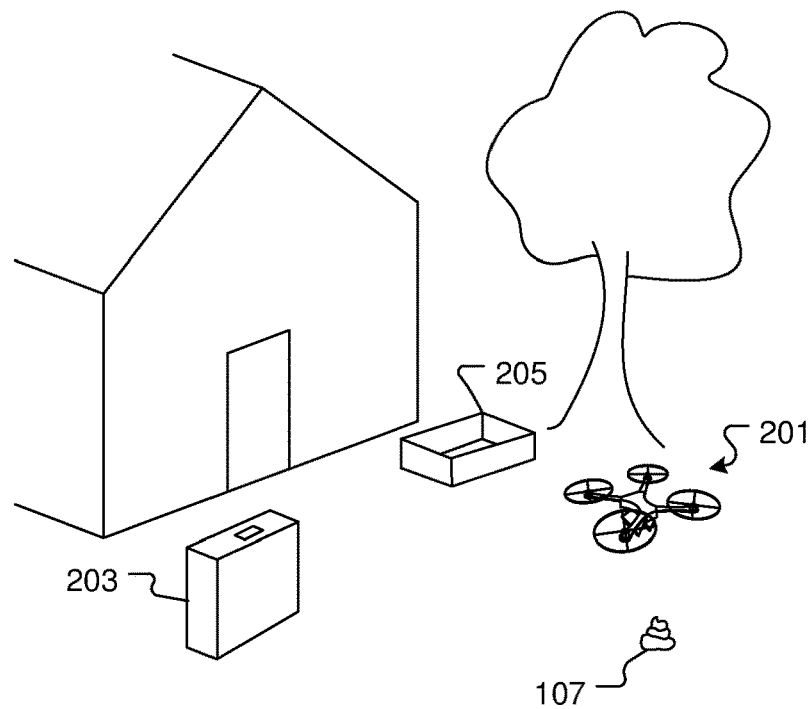
FIGS. 2A and 2B are perspective views of an animal waste disposal system in accordance with a preferred embodiment of the present application.
Figure 2B:
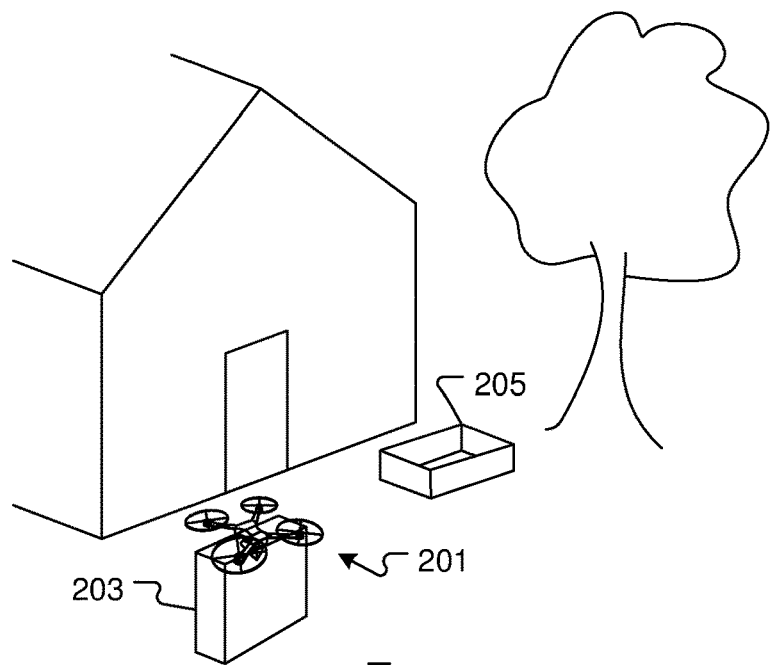

Referring now to the drawings wherein like reference characters identify corresponding or similar elements throughout the several views, FIG. 2 depicts an oblique view of an animal waste disposal system 201 in accordance with the preferred embodiment of the present application. It will be appreciated that system 201 overcomes at least one of the above-listed problems commonly associated with the conventional systems and methods to pick up and dispose of animal waste products as discussed above.

In the contemplated embodiment, system 201 is an autonomously controlled aircraft adapted to maneuver within a selected location and to collect the animal waste within the location. Thereafter, the system is configured to dispose of the waste in a container 203. The features discussed herein provide significant advantages over the prior art. For example, the system can autonomously dispose of waste, which in turn requires little to no human interaction.

Figure 3A:
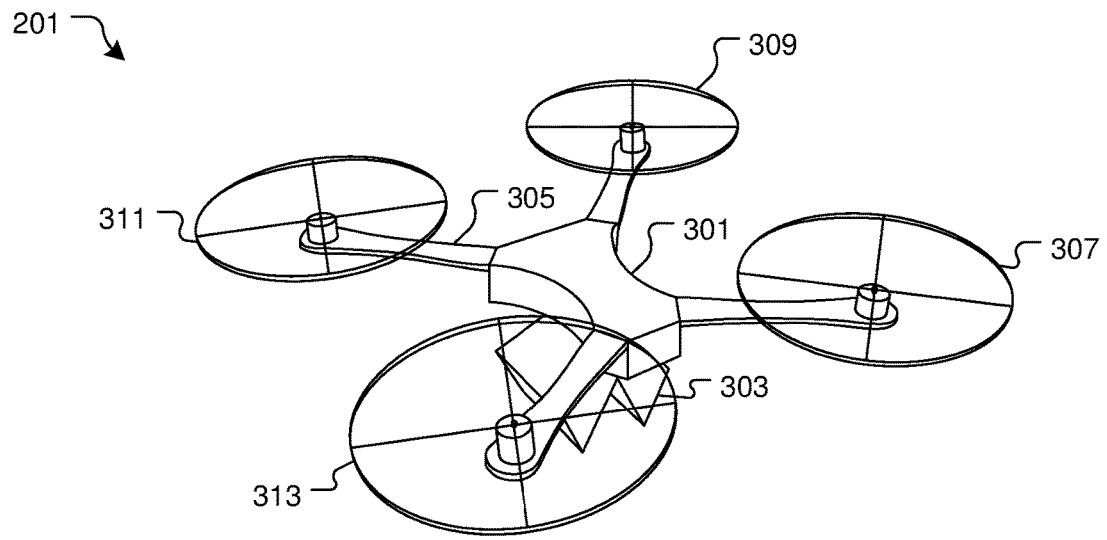
FIGS. 3A and 3B are perspective views of the system of FIG. 2A.
Figure 3B:
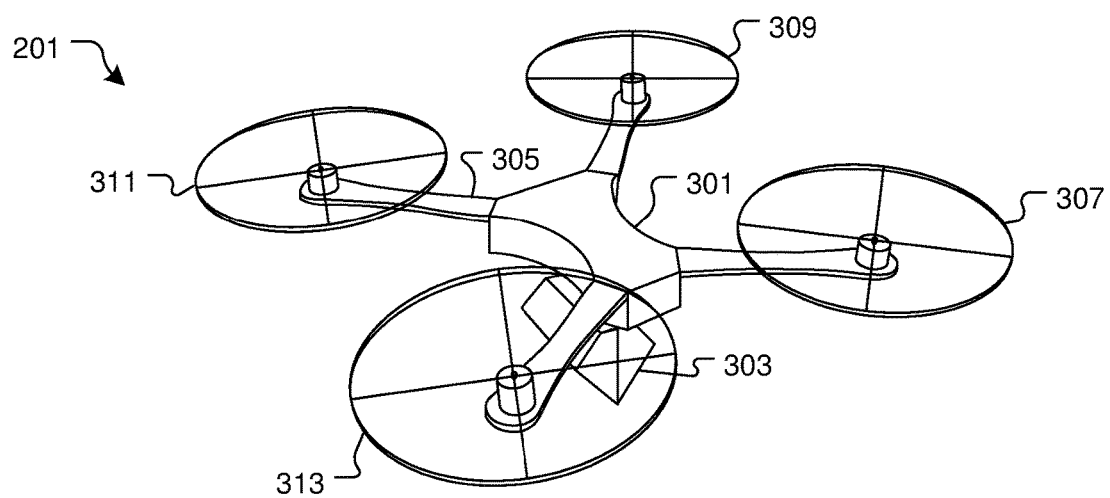

In FIGS. 3A and 3B, perspective views of the system 201 are shown having a body 301 configured to carry the operating components of the system therein. In the exemplary embodiment, four arms are rigidly attached to the body 301 and extend therefrom to secure to four lifting devices 307, 309, 311, and 313. In the contemplated embodiment, the lifting devices are motor and propeller configurations; however, it will be appreciated that alternative embodiments could include different types of lifting means. Further, it is contemplated using more or less lifting systems in an alternative embodiment. For example, the system could include three lifting systems in lieu of the contemplated embodiment.

Figure 4:
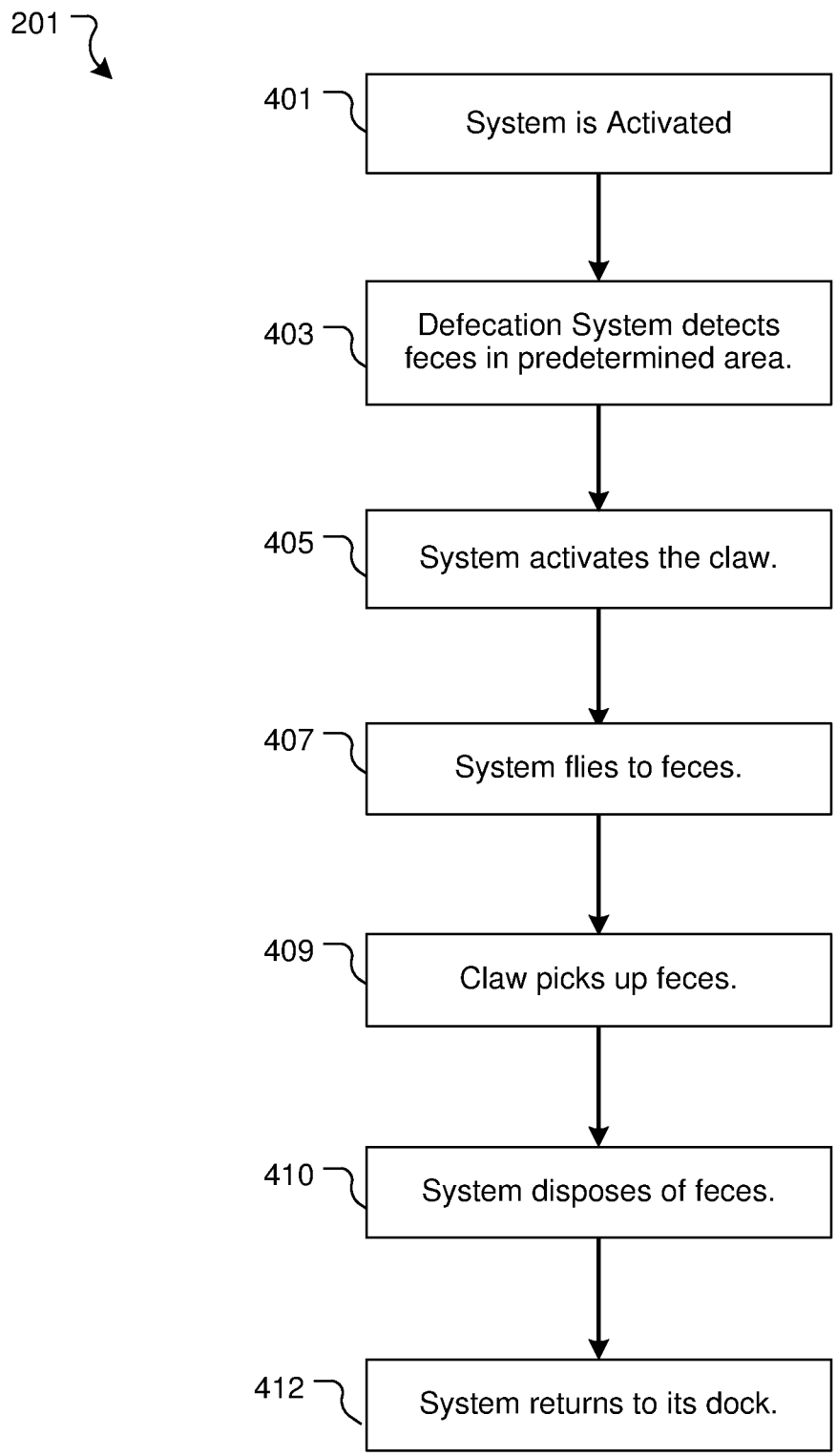
FIG. 4 is a flowchart depicting the preferred method of use.

Referring now to FIG. 4, a simplified flowchart 401 depicts the preferred method of use. For example, the system is activated and a predetermined area of detection is selected, as depicted in boxes 401 and 403. Accordingly, it will be appreciated that a determined area, e.g., a 20 foot radius, can be selected and thereafter the aircraft will fly solely in the determined area. Further, the system can be manipulated wherein a predetermined time of operation can be selected. For example, the aircraft can be operated upon command or autonomously during selected times of the day. The next step includes the process of activating the claw device 303 to collect the feces, as depicted in box 405. The aircraft flies to the detected feces and thereafter collects the feces with the claw device, as depicted in boxes 407 and 409. Finally, the system disposes of the feces in a container, as depicted in box 411.

Figure 5:
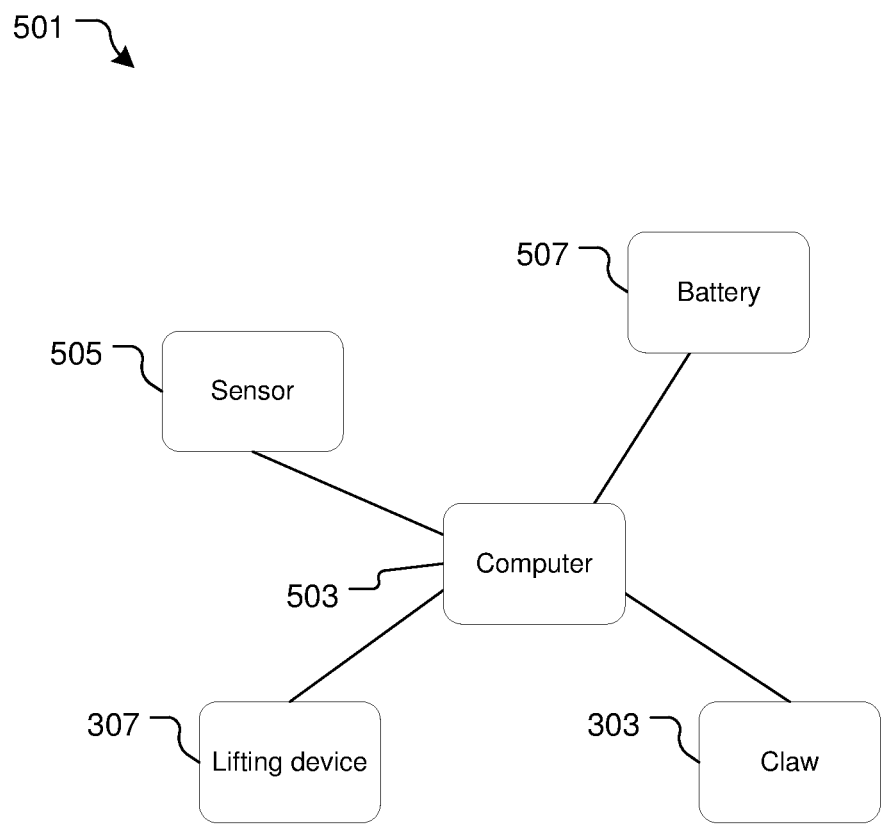
FIG. 5 is a simplified schematic of the control system.

In FIG. 5, a simplified schematic of the control system 501 is depicted having a computer 503 operably associated with the claw device 303 and the lifting device 307. In the contemplated embodiment, computer 503 includes the necessary hardware and software to perform the features discussed herein. During use, a sensor 505 is utilized to detect the presence of the feces and to relay the sensed information to the computer 503, which in turn controls the lifting devices to direct the aircraft to the place of location. Thereafter, the computer and sensors work together with the claw device to capture the feces and to direct the aircraft to the container for disposal. A battery source 507 is used to power the system components discussed herein.

In the preceding specification, the claimed subject matter has been described with reference to specific exemplary embodiments. It will, however, be evident that various modifications and changes may be made without departing from the broader spirit and scope of the claimed subject matter as set forth in the claims that follow. The specification and drawings are accordingly to be regarded as illustrative rather than restrictive. Other embodiments of the claimed subject matter may be apparent to those skilled in the art from consideration of the specification and practice of the claimed subject matter disclosed herein.

What is claimed is:

1. A method to dispose of animal feces, comprising:
   providing an autonomous aerial vehicle having:
      a body with a plurality of rotor assemblies;
      an articulated claw secured to a bottom surface of the body; and
      a sensor secured to the body;
   detecting the presences of the animal feces with the sensor;
   activating the plurality of rotor assemblies;
   flying to the location of the animal feces;
   capturing the animal feces with the claw;
   flying to a disposal dropoff location; and
   disposing of the animal feces at the dropoff location.

\* \* \* \* \*